(12) United States Patent
Li et al.

(10) Patent No.: US 8,502,589 B2
(45) Date of Patent: Aug. 6, 2013

(54) SIGNAL SWING TRIMMING APPARATUS AND METHOD THEREOF

(75) Inventors: Kun-Hsien Li, Taipei County (TW); Ding-Yu Hsin, Taipei County (TW); Chien-Hua Chen, Taipei (TW); Chih-Pin Sun, Hsinchu County (TW); Chih-Hsiang Liao, Taipei County (TW); Chien-Hua Wu, Taipei (TW); Hung-Yueh Lin, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 492 days.

(21) Appl. No.: 12/626,630

(22) Filed: Nov. 26, 2009

(65) Prior Publication Data

US 2011/0125942 A1  May 26, 2011

(51) Int. Cl.
*G06F 13/14* (2006.01)
(52) U.S. Cl.
USPC .......................................................... 327/332
(58) Field of Classification Search
USPC .......................................................... 710/106
See application file for complete search history.

(56) References Cited

U.S. PATENT DOCUMENTS

| | | | |
|---|---|---|---|
| 6,462,591 B2 | 10/2002 | Garrett | |
| 6,535,018 B1 * | 3/2003 | Kost | 326/68 |
| 6,556,052 B2 | 4/2003 | Garrett | |
| 6,772,351 B1 | 8/2004 | Werner | |
| 6,806,728 B2 | 10/2004 | Nguyen | |
| 6,924,660 B2 | 8/2005 | Nguyen | |
| 7,093,145 B2 | 8/2006 | Werner | |
| 7,151,390 B2 | 12/2006 | Nguyen | |
| 7,161,513 B2 | 1/2007 | Werner | |
| 8,020,012 B2 * | 9/2011 | Chen et al. | 713/300 |
| 8,085,008 B2 * | 12/2011 | Krishna | 323/233 |
| 2009/0251192 A1 * | 10/2009 | Ong et al. | 327/331 |
| 2010/0277145 A1 * | 11/2010 | Krishna | 323/282 |
| 2011/0125942 A1 * | 5/2011 | Li et al. | 710/106 |

* cited by examiner

*Primary Examiner* — Ryan Stiglic
(74) *Attorney, Agent, or Firm* — Winston Hsu; Scott Margo

(57) ABSTRACT

A signal swing trimming apparatus calibrates a swing level of an output signal generated from a transmitting device to a receiving device including: a comparing device coupled to the output signal for comparing the swing level of the output signal with a target swing level and generating a comparison output signal, and an adjusting device coupled to the comparing device and the transmitting device for controlling the transmitting device to adjust the swing level of the output signal according to the comparison output signal, wherein the signal swing trimming apparatus is configured to calibrate the swing level of the output signal during a hand-shake process between the transmitting device and the receiving device.

13 Claims, 4 Drawing Sheets

SIGNAL SWING TRIMMING APPARATUS AND METHOD THEREOF

BACKGROUND

The present invention relates to a signal swing trimming apparatus and method, and more particularly, to a high-speed USB output swing trimming apparatus and method.

The universal serial bus (USB) interface is one of the most common interface standards of digital wired communications. Originally released in 1995 at 12 Mbps, USB today operates at 480 Mbps and can be found in many kinds of electrical devices. Due to the advantages of a high transmission rate and the ability to plug-and-play, there is a trend to equip products with standard USB interfaces. Some of the common applications are digital cameras, external USB flash cards, and external hard disks.

Please refer to FIG. 1. FIG. 1 is a diagram illustrating a USB system 100 of prior art. The USB system 100 comprises of an USB device 102 coupled to a USB host 104. According to prior art, the data transfer between the USB device 102 and the USB host 104 is configured as a differential signal DP, DM. Thus, the input impedance of each terminal in the USB device 102 is set to 45Ω. Due to the fabricating process or other reasons, however, the input impedance of the USB device 102 may not be perfectly matched to 45Ω, which resulting in a swing of the differential signal DP, DM that may vary outside of the USB specification. Therefore, the compatibility problem that arises from the impedance mismatching between the USB device 102 and the USB host 104 is one of the most critical problems in the field of high-speed USB systems.

SUMMARY OF THE INVENTION

Therefore, one of the objectives of the present invention provides a high-speed USB output swing trimming apparatus utilizing a comparing device that shares a high-speed (HS) mode discriminator to calibrate an output swing, and method thereof.

According to an embodiment of the present invention, a signal swing trimming apparatus is disclosed. The signal swing trimming apparatus calibrates a swing level of an output signal generated from a transmitting device to a receiving device, and the signal swing trimming apparatus comprises a comparing device and an adjusting device. The comparing device is coupled to the output signal for comparing the swing level of the output signal with a target swing level and generating a comparison output signal; and the adjusting device is coupled to the comparing device and the transmitting device for controlling the transmitting device to adjust the swing level of the output signal according to the comparison output signal; wherein the signal swing trimming apparatus is configured to calibrate the swing level of the output signal during a hand-shake process between the transmitting device and the receiving device.

According to another embodiment of the present invention, a signal swing trimming method is disclosed. The signal swing trimming method calibrates a swing level of an output signal generated from a transmitting device to a receiving device, and the signal swing trimming method comprises the step of: comparing the swing level of the output signal with a target swing level and generating a comparison output signal; and adjusting the swing level of the output signal according to the comparison output signal during a hand-shake process between the transmitting device and the receiving device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
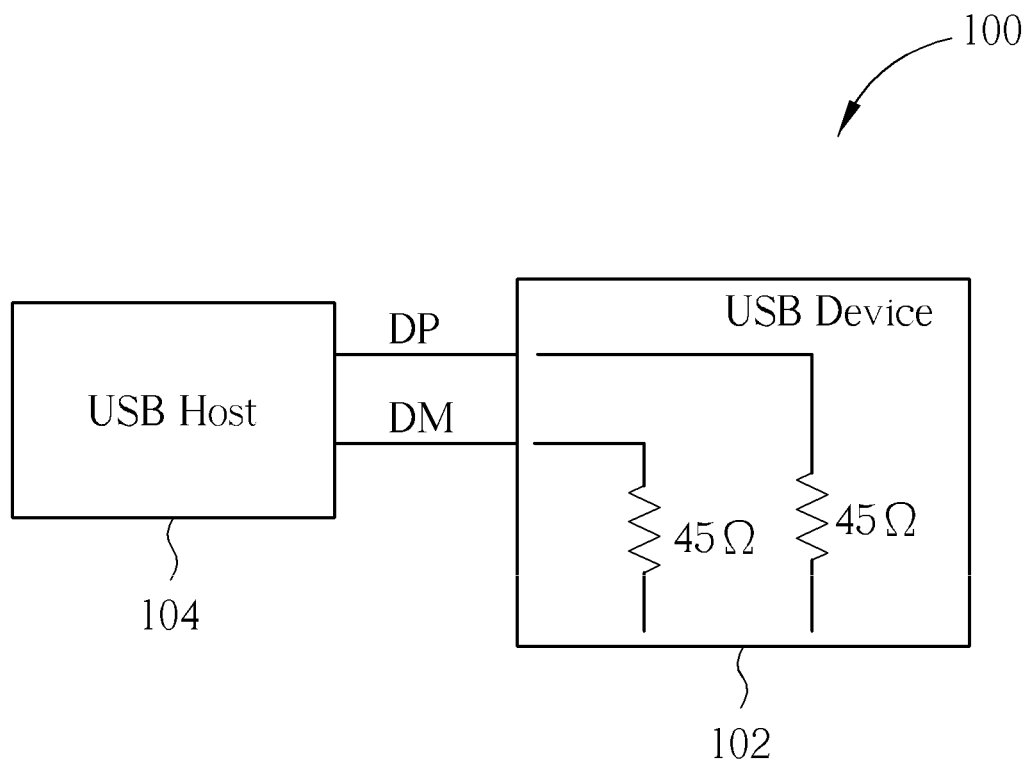
FIG. 1 is a diagram illustrating a Universal Serial Bus (USB) system of prior art.
Figure 2:
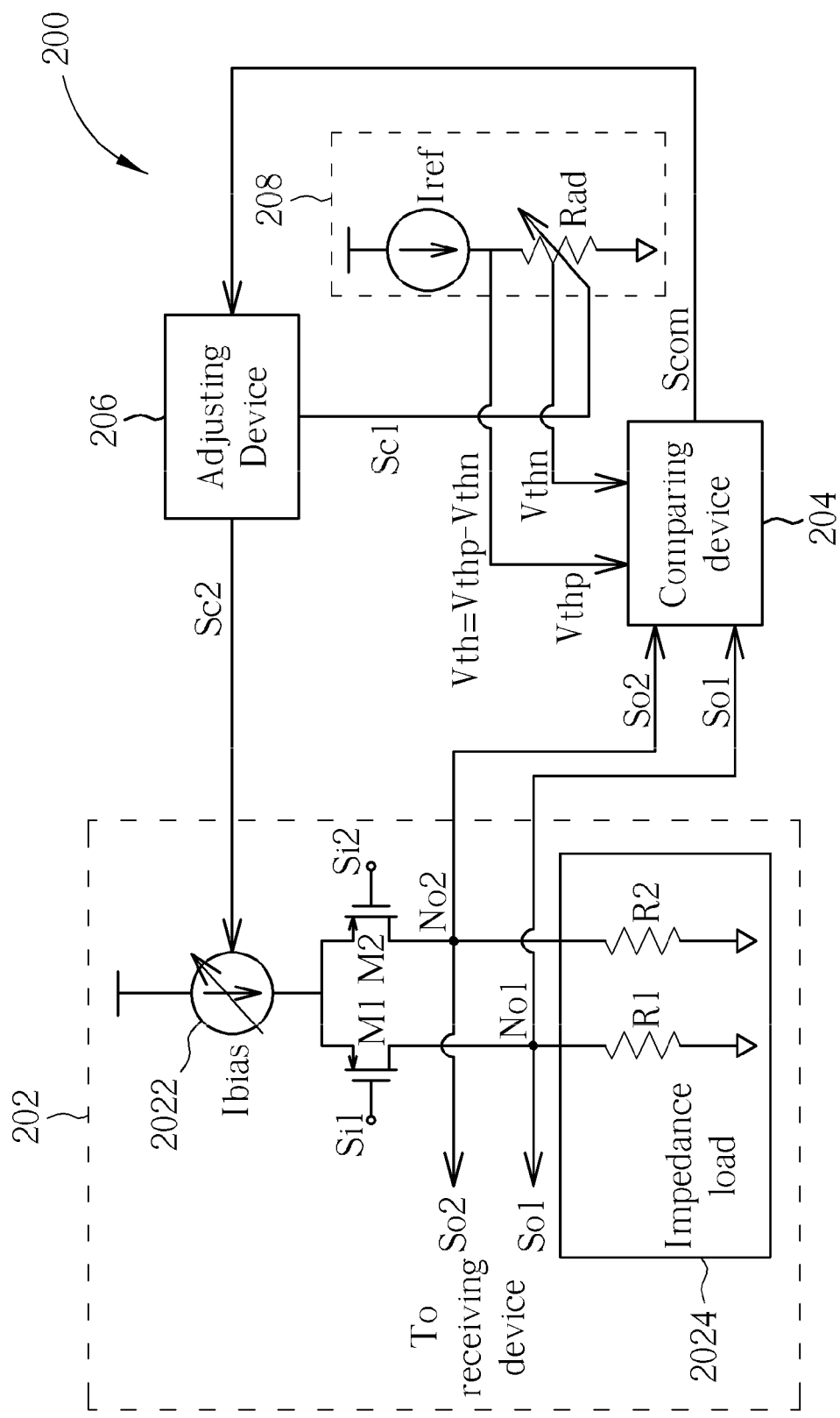
FIG. 2 is a diagram illustrating a signal swing trimming apparatus according to an embodiment of the present invention.

Please refer to FIG. 2. FIG. 2 is a diagram illustrating a signal swing trimming apparatus 200 according to an embodiment of the present invention. The signal swing trimming apparatus 200 is utilized to calibrate a swing level of an output signal, which is a differential output including a first output signal So1 and a second output signal So2, generated from a transmitting device 202 to a receiving device. The signal swing trimming apparatus 200 comprises a comparing device 204, an adjusting device 206, and a swing level generator 208. The comparing device 204 is coupled to the output signal to compare the swing level of the output signal with a target swing level Vth and generate a comparison output signal Scom. The adjusting device 206 is coupled to the swing level generator 208 and the transmitting device 202 controls the transmitting device 202 for adjusting the swing level of the output signal according to the comparison output signal Scom. The signal swing trimming apparatus 200 is configured to calibrate the swing level of the output signal during a hand-shake process between the transmitting device 202 and the receiving device. The swing level generator 208 is coupled to the comparing device 204 and the adjusting device 206 for setting the target swing level Vth to the comparing device 204 according to a control signal Sc1 of the adjusting device 206.

Figure 3:
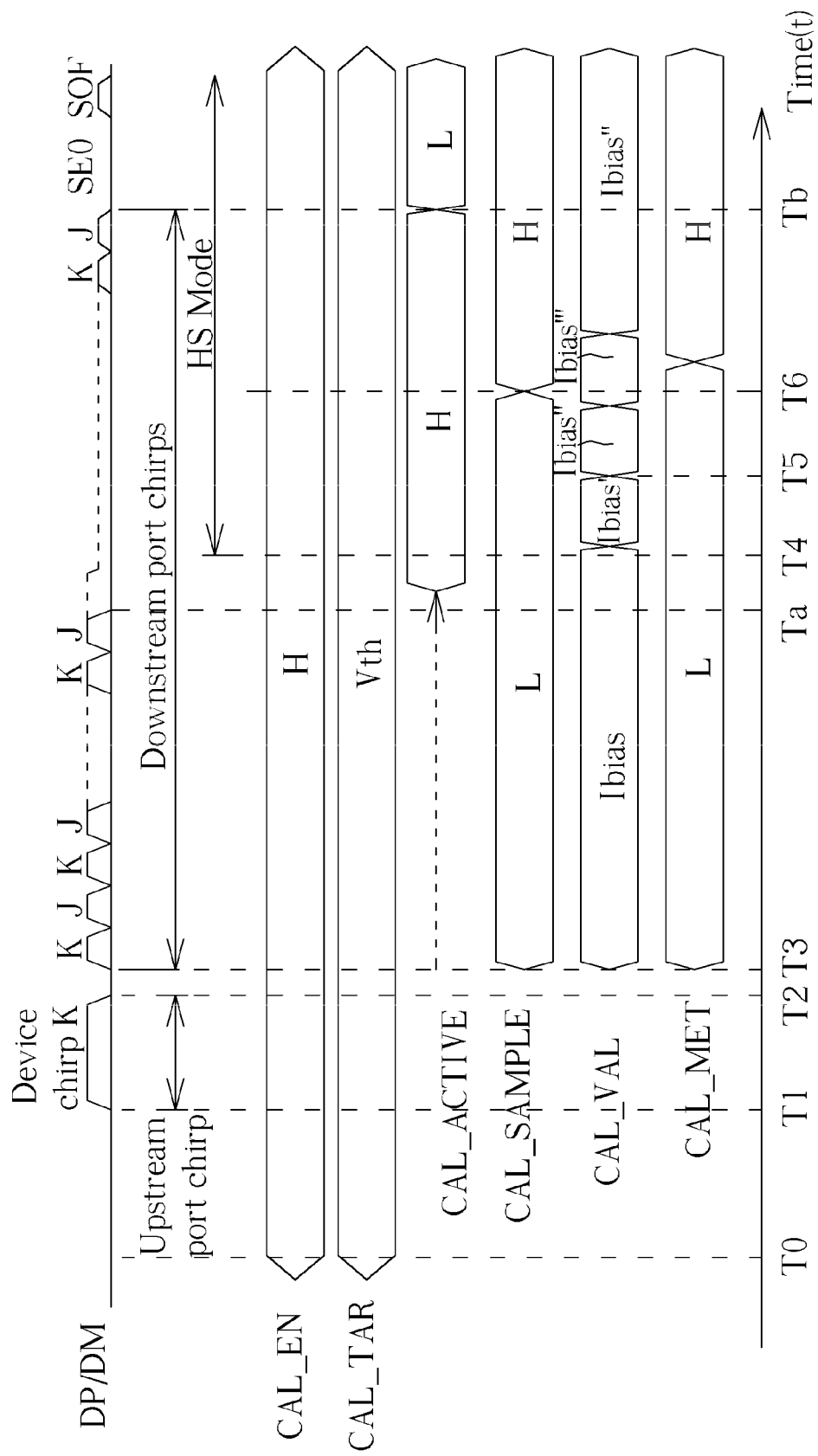
FIG. 3 is a timing diagram illustrating a calibration process of the output signal of the USB transmitter in the high-speed (HS) hand-shaking process.

Please note that, according to the present invention, one of the embodiments of the signal swing trimming apparatus 200 adjusts the swing level of the output signal of a USB transmitter under a high-speed (HS) mode. Thus, the transmitting device 202 is a USB transmitter of a USB host, and the signal swing trimming apparatus 200 is configured to calibrate the swing level of the output signal during a specific time period Tdet in the HS hand-shake process between the USB host and a USB device having the receiving device, where the specific time period Tdet is between a time Ta when the USB device detects a predetermined number of downstream port KJ chirps generated from the USB host and a time Tb when the USB host stops transmitting downstream port KJ chirps to the USB device as shown in FIG. 3. FIG. 3 is a timing diagram illustrating a calibration process of the output signal of the USB transmitter in the high-speed (HS) hand-shaking process.

The transmitting device 202 comprises a differential input pair, an adjustable bias current generator 2022, and an impedance load 2024, in which the impedance load 2024 is a differential output load. The differential input pair is cascoded with the impedance load 2024, and the adjustable bias current generator 2022 is coupled to the adjusting device 206 for generating a bias current Ibias for the transmitting device 202 according to a control signal Sc2. The differential input pair comprises a PMOS transistor M1 and a PMOS transistor M2 for respectively receiving a first input signal Si1 and a second input signal Si2. In this embodiment, the impedance load 2024 may comprise a first impedance R1 and a second impedance R2. The first impedance R1 is to a drain node No1 of the PMOS transistor M1, and the second impedance R2 is coupled to a drain node No2 of the PMOS transistor M2. Here, the first output signal So1 is outputted at the drain node No1 and a second output signal So2 is outputted at the drain node No2.

The swing level generator 208 comprises a reference current Iref and an adjustable resistor Rad, in which the reference current Iref flows through the adjustable resistor Rad that is controlled by the control signal Sc1. The swing level generator 208 generates a first reference voltage level Vthp and a second reference voltage level Vthn to the comparing device 204 for setting the target swing level Vth, i.e., Vth=Vthp−Vthn as shown in FIG. 2. The comparing device 204 compares a difference between the first output signal So1 and the second output signal So2 with the target swing level Vth to generate the comparison output signal Scorn to the adjusting device 206.

Please refer to FIG. 2 in conjunction with FIG. 3. According to the embodiment of the present invention, when the USB device is coupled to the USB host (i.e., the receiving device coupled to the transmitting device 202) at time T0, the high-speed (HS) hand-shaking process begins. Meanwhile, a signal CAL_EN as shown in FIG. 3 is set to a high level H to indicate that the signal swing trimming apparatus 200 is enabled, and a signal CAL_TAR indicates that the target swing level Vth is also set by the adjusting device 206. After the receiving device asserts Device Chirp K at time T1 and removes the Device Chirp K at time T2, the transmitting device 202 starts to transmit at least six Downstream Port KJ Chirps to the receiving device at time T3. At time T3, for instance, a signal CAL_SAMPLE is set to a low level L to indicate that the difference between the first output signal So1 and the second output signal So2 is smaller than the target swing level Vth. Meanwhile, a signal CAL_VAL indicates that the adjusting device 206 generates the control signal Sc2 to set the adjustable bias current generator 2022 for generating the bias current Ibias. In addition, a signal CAL_MET is at low level L before the difference between the first output signal So1 and the second output signal So2 larger than the target swing level Vth. When the transmitting device 202 transmits six Downstream Port KJ Chirps to the receiving device at time Ta, a signal CAL_ACTIVE is activated to high level H for activating the calibration process. At time T4, the receiving device detects the Downstream Port KJ Chirps and enters the high-speed (HS) mode, and the adjusting device 206 adjusts the bias current Ibias to the bias current Ibias'. Then, the comparing device 204 compares if the difference between the first output signal So1 and the second output signal So2 is larger than the target swing level Vth. When the difference between the first output signal So1 and the second output signal So2 is not larger than the target swing level Vth, then the comparison output signal Scom does not have a level transition, i.e., H to L or L to H transition, and both the signal CAL_SAMPLE and the signal CAL_MET remain at low level L. Then, at time T5, the adjusting device 206 adjusts the bias current Ibias' to the bias current Ibias". Similarly, the comparing device 204 compares the difference between the first output signal So1 and the second output signal So2 until the difference is larger than the target swing level Vth. At time T6, the comparing device 204 detects that the difference between the first output signal So1 and the second output signal So2 is larger than the target swing level Vth under the bias current Ibias''', which means the comparison output signal Scom has had a level transition when the bias current Ibias" was adjusted to the bias current Ibias'''. Then, the signal CAL_SAMPLE switches to high level H and the signal CAL_MET switches to high level H too. Accordingly, the signal swing trimming apparatus 200 acknowledges that the signal swing of the first output signal So1 and the second output signal So2 under the bias current Ibias" may be the closest signal swing to the target swing level Vth. Then, the signal CAL_VAL switches back to the previous value. At the same time, the adjusting device 206 also adjusts the bias current Ibias''' back to the bias current Ibias". Finally, the calibration process is finished at time Tb when the signal CAL_ACTIVE turns to low level L. Please note that the present invention is not limited in selecting the bias current Ibias" as the final bias current: one embodiment of the present invention selects the bias current Ibias''' as the final bias current of the transmitting device 202.

Figure 4:
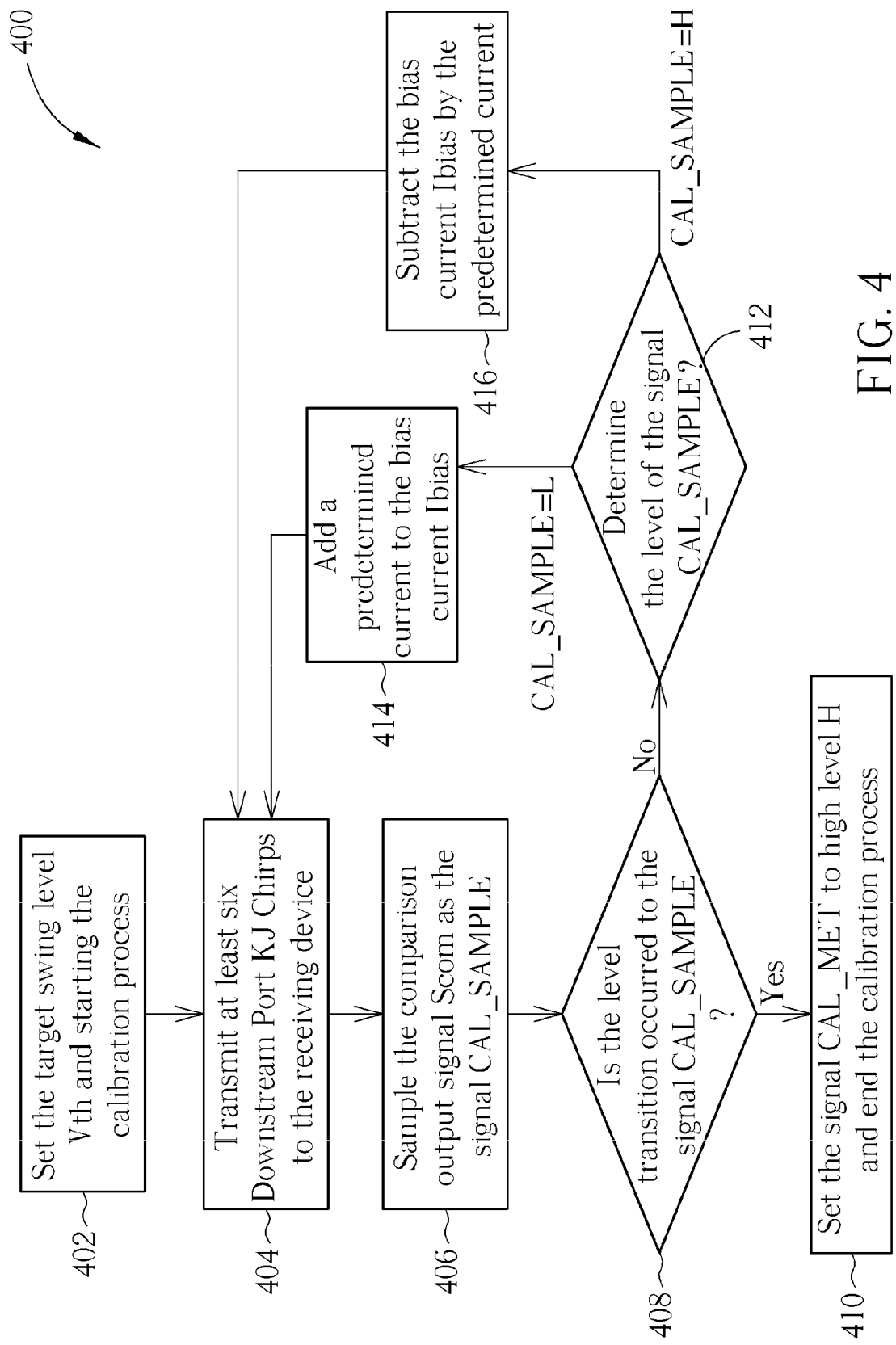
FIG. 4 is a flowchart illustrating a calibration method according to the embodiment as shown in FIG. 2.

Please refer to FIG. 4, which is a flowchart illustrating a calibration method 400 according to the embodiment as shown in FIG. 2. Therefore, the following description is described in conjunction with the signal swing trimming apparatus 200 as shown in FIG. 2 and the calibration process as shown in FIG. 3. Provided that substantially the same result is achieved, the steps of the flowchart shown in FIG. 4 need not be in the exact order shown and need not be contiguous: other steps can be intermediate. The calibration method comprises the following steps:

Step 402: Set the target swing level Vth and start the calibration process;

Step 404: Transmit at least six Downstream Port KJ Chirps to the receiving device;

Step 406: Sample the comparison output signal Scom as the signal CAL_SAMPLE;

Step 408: When the level transition, i.e., H to L or L to H transition, occurs to the signal CAL_SAMPLE, go to Step 410; when no level transition occurs to the signal CAL_SAMPLE, go to Step 412;

Step 410: Set the signal CAL_MET to high level H and end the calibration process;

Step 412: When the signal CAL_SAMPLE is in low level L, go to Step 414; when the signal CAL_SAMPLE is in high level H, go to Step 416;

Step 414: Add a predetermined current to the bias current Ibias, then go to Step 404;

Step 416: Subtract the bias current Ibias by the predetermined current, then go to Step 404.

Similar to the embodiment as shown in FIG. 2, the calibration method is performed under the high-speed hand-shaking process of the USB device. In Step 402, the adjusting device 206 sets the target swing level Vth for the comparing device 204. In Step 404, the transmitting device 202 transmits at least six Downstream Port KJ Chirps to the receiving device. In Step 406, setting the signal CAL_SAMPLE is set to low level L when indicating that the difference between the first output signal So1 and the second output signal So2 is smaller than the target swing level Vth; similarly, the signal CAL_SAMPLE is set to high level H when indicating that the difference is larger than the target swing level Vth, and this the not be the limitation of the present invention. In Step 410, the signal CAL_MET is set high level H, when indicating the difference between the first output signal So1 and the second output signal So2 is larger than the target swing level Vth. In Step 414, the adjusting device 206 adds a predetermined current to the bias current Ibias to generate the bias current Ibias' as shown in the FIG. 3. On the other hand, in Step 416, the adjusting device 206 subtracts the bias current Ibias by the predetermined current to generate the bias current Ibias' as shown in the FIG. 3.

In general, after reading the above-mentioned disclosure, those skilled in this art are appreciated to understand that the adjusting device 206 keeps monitoring the comparison output signal Scom and controlling the adjustable bias current generator 2022 to adjust the bias current Ibias for reducing a difference between the swing level of the output signal and the target swing level Vth, until the comparison output signal Scom has the level transition.

Those skilled in the art will readily observe that numerous modifications and alterations of the device and method may be made while retaining the teachings of the invention.

What is claimed is:

1. A signal swing trimming apparatus for calibrating a swing level of a differential output signal generated by a differential output node from a transmitting device to a receiving device, the signal swing trimming apparatus comprising:
   a comparing device, coupled to the differential output node of the transmitting device, for comparing the swing level of the differential output signal with a target swing level and generating a comparison output signal; and
   an adjusting device, coupled to the comparing device and the transmitting device, for controlling the transmitting device to adjust the swing level of the differential output signal according to the comparison output signal;
   wherein the signal swing trimming apparatus is configured to calibrate the swing level of the differential output signal during a hand-shake process between the transmitting device and the receiving device, the differential output signal includes a first signal and a second signal, and the swing level is a difference between the first signal and the second signal.

2. The signal swing trimming apparatus of claim 1, wherein the transmitting device is a USB transmitter of a USB host, and the signal swing trimming apparatus is configured to calibrate the swing level of the differential output signal during a specific time period in the hand-shake process between the USB host and a USB device having the receiving device, where the specific time period is between a time when the USB device detects a predetermined number of downstream port chirps generated from the USB host and a time when the USB host stops transmitting downstream port chirps to the USB device.

3. The signal swing trimming apparatus of claim 1, wherein the transmitting device is a USB transmitter, and the comparing device is shared between the signal swing trimming apparatus and a high-speed (HS) mode discriminator.

4. The signal swing trimming apparatus of claim 1, further comprising:
   a swing level generator, coupled to the comparing device and the adjusting device, for setting the target swing level to the comparing device according to a control signal of the adjusting device.

5. The signal swing trimming apparatus of claim 4, wherein the swing level generator generates a first reference voltage level and a second reference voltage level to the comparing device for setting the target swing level, and the comparing device compares the difference between the first signal and the second signal with the target swing level to generate the comparison output signal to the adjusting device.

6. The signal swing trimming apparatus of claim 1, wherein the adjusting device generates a control signal according to the comparison output signal, and the transmitting device comprises an adjustable bias current generator, coupled to the adjusting device, for adjusting a bias current for the transmitting device according to the control signal.

7. The signal swing trimming apparatus of claim 6, wherein the adjusting device keeps monitoring the comparison output signal and controlling the adjustable bias current generator to adjust the bias current for reducing a difference between the swing level of the differential output signal and the target swing level, until the comparison output signal has a level transition.

8. A signal swing trimming method for calibrating a swing level of a differential output signal generated from a differential output node of a transmitting device to a receiving device, the signal swing trimming method comprising:
   comparing the swing level of the differential output signal on the differential output node with a target swing level and generating a comparison output signal; and
   adjusting the swing level of the differential output signal according to the comparison output signal during a hand-shake process between the transmitting device and the receiving device;
   wherein the differential output signal includes a first signal and a second signal,
   and the swing level is a difference between the first signal and the second signal.

9. The signal swing trimming method of claim 8, wherein the step of adjusting the swing level of the differential output signal comprises:
   determining a specific time period in the hand-shake process;
   calibrating the swing level of the differential output signal during a specific time period in the hand-shake process;
   wherein the specific time period is between a time when a USB device having the receiving device detects a predetermined number of downstream port chirps generated from a USB host and a time when the USB host stops transmitting downstream port chirps to the USB device, where the transmitting device is a USB transmitter of the USB host.

10. The signal swing trimming method of claim 8, further comprising:
    setting the target swing level.

11. The signal swing trimming method of claim 10, wherein the steps of setting the target swing level comprising:
    generating a first reference voltage level and a second reference voltage level for setting the target swing level; and
    the steps of comparing the swing level of the differential output signal comprising:

comparing the difference between the first signal and the second signal with the target swing level to generate the comparison output signal.

12. The signal swing trimming method of claim 8, wherein the step of adjusting the swing level of the differential output signal comprises:
  generating a control signal according to the comparison output signal; and
  adjusting a bias current for the transmitting device according to the control signal.

13. The signal swing trimming method of claim 12, wherein the step of adjusting the swing level of the differential output signal further comprises:
  keep monitoring the comparison output signal and adjusting the bias current for reducing a difference between the swing level of the differential output signal and the target swing level, until the comparison output signal has a level transition.

* * * * *